(12) United States Patent
Chang et al.

(10) Patent No.: US 10,429,952 B2
(45) Date of Patent: Oct. 1, 2019

(54) WIRELESS MOUSE

(71) Applicants: BOE Technology Group Co., Ltd., Beijing (CN); Beijing BOE Optoelectronics Technology Co., Ltd., Beijing (CN)

(72) Inventors: Cheng Chang, Beijing (CN); Chao Yu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/737,203

(22) PCT Filed: Apr. 25, 2017

(86) PCT No.: PCT/CN2017/081865
§ 371 (c)(1),
(2) Date: Dec. 15, 2017

(87) PCT Pub. No.: WO2017/215353
PCT Pub. Date: Dec. 21, 2017

(65) Prior Publication Data
US 2018/0373353 A1   Dec. 27, 2018

(30) Foreign Application Priority Data

Jun. 13, 2016   (CN) .......................... 2016 1 0420783

(51) Int. Cl.
*G06F 3/0354*   (2013.01)
*G06F 3/038*   (2013.01)
*H02J 7/32*   (2006.01)

(52) U.S. Cl.
CPC ........ *G06F 3/03543* (2013.01); *G06F 3/0383* (2013.01); *G06F 3/03544* (2013.01);
(Continued)

(58) Field of Classification Search
CPC ............... G06F 3/03543; G06F 3/0383; G06F 2203/0384; G06F 3/03544; Y02B 40/90; H02J 7/32
See application file for complete search history.

(56) References Cited

U.S. PATENT DOCUMENTS

| 4,091,302 A | * | 5/1978 | Yamashita | ............... H02N 2/18 310/339 |
| 2003/0095101 A1 | * | 5/2003 | Jou | ....................... G06F 3/0312 345/163 |

(Continued)

FOREIGN PATENT DOCUMENTS

| CN | 103573571 A | 2/2014 |
| CN | 203455783 U | 2/2014 |

(Continued)

OTHER PUBLICATIONS

English Translation of International Search Report and Written Opinion from International Patent Application No. PCT/CN2017/081865, dated Aug. 1, 2017, 5 pages.

*Primary Examiner* — Tom V Sheng
(74) *Attorney, Agent, or Firm* — Westman, Champlin & Koehler, P.A.

(57) ABSTRACT

A wireless mouse is disclosed. The wireless mouse includes: a mouse housing, and an electric generating device mounted in the mouse housing; wherein the electric generating device includes: a first rotation shaft mounted pivotably in the mouse housing, an eccentric wheel and a first annular conductor fixed on the first rotation shaft, and a first magnet fixed in the mouse housing, wherein the first annular conductor is arranged in a magnet field generated by the first
(Continued)

magnet, and is configured such that magnetic flux through an annular section of the first annular conductor changes when the first rotation shaft drives the first annular conductor to rotate. The wireless mouse provided by the present disclosure is used to input operation information to a computer.

20 Claims, 2 Drawing Sheets

(52) U.S. Cl.
CPC ........ *H02J 7/32* (2013.01); *G06F 2203/0384* (2013.01); *Y02B 40/90* (2013.01)

(56) References Cited

U.S. PATENT DOCUMENTS

| | | | | |
|---|---|---|---|---|
| 2012/0270597 | A1* | 10/2012 | Ou .................... | G06F 1/1626 455/556.1 |
| 2013/0147425 | A1* | 6/2013 | Chang ................ | H02J 7/32 320/108 |
| 2016/0041633 | A1* | 2/2016 | Weng ................. | G06F 3/03543 345/163 |
| 2016/0041634 | A1* | 2/2016 | Weng ................. | G06F 3/03543 345/163 |

FOREIGN PATENT DOCUMENTS

| | | |
|---|---|---|
| CN | 204089551 U | 1/2015 |
| CN | 205158309 U | 4/2016 |
| CN | 106125960 A | 11/2016 |

* cited by examiner

WIRELESS MOUSE

CROSS-REFERENCE TO RELATED APPLICATION

This application is a Section 371 National Stage Application of International Application No. PCT/CN2017/081865, filed Apr. 25, 2017, which is not yet published, and claims benefit of the Chinese Patent Application No. 201610420783.8, filed with the State Intellectual Property Office of China on Jun. 13, 2016, which is incorporated herein by reference in its entirety.

BACKGROUND OF THE DISCLOSURE

Field of the Disclosure

The present disclosure relates to the technical field of computer-associated apparatus, and in particular, to a wireless mouse.

Description of the Related Art

As science and technology develop, more and more wireless transmission devices are known by the people and are widely used. A wireless mouse, as an important wireless transmission device, has a high requirement on convenience of operation. Besides parameters such as sampling frequency, processing speed, battery capacity and available utility time of the wireless mouse may also become one of the important parameters that estimate the performance of the wireless mouse.

At present, the widely used wireless mouse mainly needs dry batteries to supply power. Thus, the dry batteries in the wireless mouse must be replaced timely once they have been discharged completely; otherwise, the wireless mouse will not work. The wireless mouse has large power consumption and thus typically the dry batteries may be discharged soon. Therefore, the dry batteries need to be replaced frequently. It is not convenient for users. In addition, frequent replacement of the dry batteries may produce a great deal of waste dry batteries. As the waste dry batteries have low value in use and the dry batteries are used everywhere, they may tend to cause pollution to environment. It is not desired for protection of environment.

Currently, a rechargeable wireless mouse has also been sold in market. In the rechargeable wireless mouse, a lithium ion battery and a charging control circuit are mounted within a mouse housing, so as to achieve charging of the wireless mouse. However, in use, the rechargeable wireless mouse needs to be charged frequently due to its high power consumption. When the lithium ion battery has been discharged completely and charging cables are not available, the rechargeable wireless mouse will not be restored by any emergency actions.

SUMMARY

The present disclosure provides a wireless mouse, including: a mouse housing, and an electric generating device mounted in the mouse housing, wherein the electric generating device includes: a first rotation shaft mounted pivotably in the mouse housing, an eccentric wheel fixed on the first rotation shaft, a first annular conductor fixed on the first rotation shaft, and a first magnet fixed in the mouse housing, wherein the first annular conductor is arranged in a magnet field generated by the first magnet, and is configured such that magnetic flux through an annular section of the first annular conductor changes when the first rotation shaft drives the first annular conductor to rotate.

According to an embodiment, the first rotation shaft is arranged perpendicular to a bottom surface of the mouse housing and the eccentric wheel has a swinging plane parallel to the bottom surface of the mouse housing.

According to an embodiment, the electric generating device further includes: a second magnet fixed in the mouse housing, a second rotation shaft mounted pivotably in the mouse housing, and a first linkage slider mechanism connected to a mouse left key of the mouse housing and the second rotation shaft respectively for transmission of motion, and wherein a second annular conductor is fixed on the second rotation shaft and located in a magnet field generated by the second magnet, and is configured such that magnetic flux through an annular section of the second annular conductor changes when the second rotation shaft drives the second annular conductor to rotate.

According to an embodiment, the first linkage slider mechanism includes: a first guide rail arranged on a bottom surface of the mouse housing and provided with a first guide groove perpendicular to the second rotation shaft; a first slider mounted slidably in the first guide groove; and two first connecting rods, wherein each of the two first connecting rods has one end hinged with the first slider, and one of the two first connecting rods has another end connected to the mouse left key of the mouse housing and the other one of the two first connecting rods has another end connected to the second rotation shaft.

According to an embodiment, the electric generating device further includes: a third magnet fixed in the mouse housing, a third rotation shaft mounted pivotably in the mouse housing, and a second linkage slider mechanism connected to a mouse right key of the mouse housing and the third rotation shaft respectively for transmission of motion, and wherein a third annular conductor is fixed on the third rotation shaft and located in a magnet field generated by the third magnet, and is configured such that magnetic flux through an annular section of the third annular conductor changes when the third rotation shaft drives the third annular conductor to rotate.

According to an embodiment, the second linkage slider mechanism includes: a second guide rail arranged on a bottom surface of the mouse housing and provided with a second guide groove perpendicular to the third rotation shaft; a second slider mounted slidably in the second guide groove; and two second connecting rods, wherein each of the two second connecting rods has one end hinged with the second slider, and one of the two second connecting rods has another end connected to the mouse right key of the mouse housing and the other one of the two second connecting rods has another end connected to the third rotation shaft.

According to an embodiment, the first linkage slider mechanism further includes a spring fixedly connected to the mouse housing and the first slider to drive the first slider to return; and/or wherein the second linkage slider mechanism further includes a spring fixedly connected to the mouse housing and the second slider to drive the second slider to return.

According to an embodiment, all of the first magnet, the second magnet and the third magnet are U-shaped magnets.

According to an embodiment, the first magnet is a bar-shaped magnet and the wireless mouse includes two first magnets, and one of the two first magnets has N pole facing towards S pole of the other one of the two first magnets; and/or the second magnet is a bar-shaped magnet and the wireless mouse includes two second magnets, and one of the two second magnets has N pole facing towards S pole of the other one of the two second magnets; and/or the third magnet is a bar-shaped magnet and the wireless mouse includes two third magnets, and one of the two third magnets has N pole facing towards S pole of the other one of the two third magnets.

According to an embodiment, all of the first magnet, the second magnet and the third magnet are bar-shaped magnets; the magnet field generated by the first magnet, the magnet field generated by the second magnet and the magnet field generated by the third magnet are generated by four bar-shaped magnets; wherein one of the four bar-shaped magnets is used to generate the magnet field generated by the first magnet and the magnet field generated by the second magnet, and one of the four bar-shaped magnets is used to generate the magnet field generated by the first magnet and the magnet field generated by the third magnet.

According to an embodiment, all of the first annular conductor, the second annular conductor and the third annular conductor are rectangular metal ring conductors.

According to an embodiment, the wireless mouse further includes a rectifier filter electrically connected to the electric generating device.

According to an embodiment, the wireless mouse further includes: a battery management chip electrically connected to the rectifier filter and a lithium ion battery electrically connected to the battery management chip.

According to an embodiment, the wireless mouse further includes: a charging interface electrically connected to the battery management chip and a dustproof cap covering the charging interface.

According to an embodiment, the wireless mouse further includes: a main control circuit board electrically connected to the battery management chip; wherein the main control circuit board is provided with a control chip, a light emitting element, a light signal processing chip and a wireless signal transmitting module, the light signal processing chip and the wireless signal transmitting module being connected to the control chip in a manner of signal connection respectively; wherein the wireless signal transmitting module is a RF transmitting module or a Bluetooth wireless transmitting module.

BRIEF DESCRIPTION OF THE DRAWINGS

Figures illustrated herein are intended for further understanding the present disclosure and constitute a part of the present disclosure. Exemplified embodiments and their explanations of the present disclosure are intended to interpret the present disclosure, instead of forming inappropriate limitations to the present disclosure. In the figures.

DETAILED DESCRIPTION OF PREFERRED EMBODIMENTS OF THE DISCLOSURE

Figure 1:
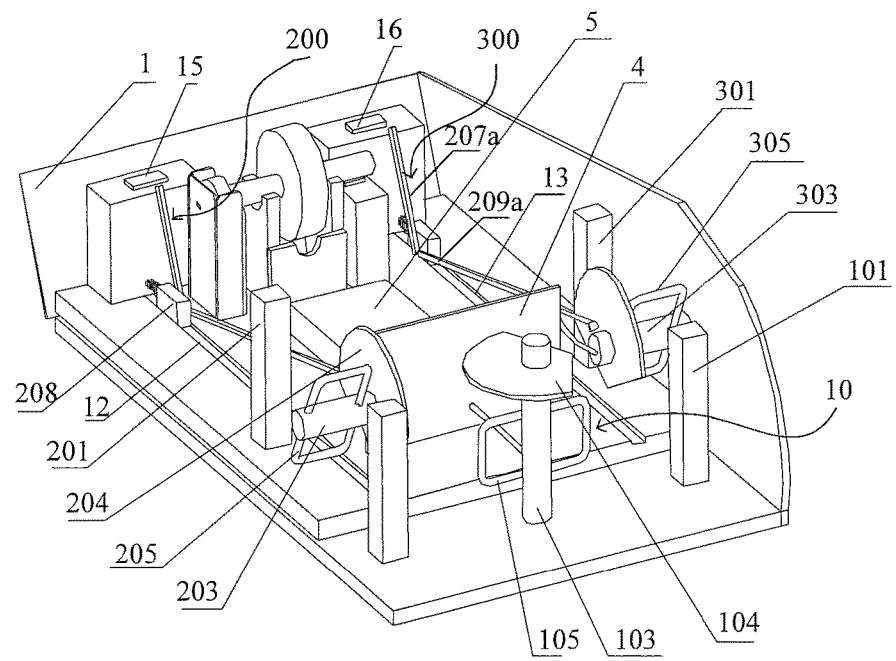
FIG. 1 is a schematic view showing an internal structure of a wireless mouse according to an embodiment of the present disclosure.

In order to further explain the present disclosure, wireless mice provided by the exemplified embodiments of the present disclosure will be explained in detail with reference to the accompanied drawings below.

In the description of embodiments of the present disclosure, it should be understood that orientation or position relation indicated by terms such as "central", "up", "down", "front", "back", "left", "right", "vertical", "horizontal", "top", "bottom", "inner" or "outer" are provided on a basis of the orientation or position relation shown in the drawings. They are only intended to explain the embodiments of the present disclosure for the sake of brevity, instead of representing or implying that the associated devices or elements must have any special orientations, must be constructed and operated in any special orientations. Thus, they cannot be understood as limiting the present disclosure.

The terms of "first", "second" are only intended for description, instead of representing or implying the relative significance or implying number of the indicated technical features. Thus, the features defined by the terms of "first" and "second" may explicitly or impliedly include one or more features. In the description of the embodiments of the present disclosure, the term of "a plurality of" represents two or more unless otherwise specified.

In the description of the embodiments of the present disclosure, it should be noted that the terms of "mount", "connecting" and "connection" should be explained broadly, for example, they may represent fixed connection, or may represent detachable connection or integral connection; may represent mechanical connection, or may represent electrical connection; may represent direct connection, or may represent indirect connection via an intermediate medium, or may represent internal communication of two elements, unless it is explained explicitly otherwise. For the skilled person in the art, the specific signification of the above terms in the embodiments of the present disclosure may be understood according to specific circumstance.

With reference to FIG. 1, an embodiment of the present disclosure provides a wireless mouse. The wireless mouse includes: a mouse housing 1, and an electric generating device 10 mounted in the mouse housing 1. The electric generating device 10 includes: a first rotation shaft 103 mounted pivotably in the mouse housing 1, an eccentric wheel 104 and a first annular conductor 105 fixed on the first rotation shaft 103, and a first magnet 101 fixed in the mouse housing. The first annular conductor 105 is arranged in a magnet field generated by the first magnet 101; and when the first rotation shaft 103 drives the first annular conductor 105 to rotate, magnetic flux through an annular section of the first annular conductor 105 changes.

In the wireless mouse provided by the above embodiments of the present disclosure, the specific examples of pivot connection between the first rotation shaft 103 and the mouse housing 1 of the wireless mouse include, but is not limited to: a rotation shaft hole is arranged in a body of the mouse housing 1 of the wireless mouse, the first rotation shaft 103 may be inserted in the rotation shaft hole and be in clearance fit with the rotation shaft hole; or a bearing block, on which a bearing is mounted, is mounted in the mouse housing of the wireless mouse, and the first rotation shaft 103 is in transition fit with an inner ring of the bearing. The eccentric wheel 104 and the first annular conductor 105 may be fixed on the first rotation shaft 103 for example by means of key connection, welding connection, rivet connection, or threaded connection. The first magnet 101 is fixed directly in the mouse housing 1 of the wireless mouse and the first annular conductor 105 is provided in a magnet field generated by the first magnet 101.

When the above wireless mouse swings or moves in use, since the first rotation shaft 103 in the electric generating device 10 of the wireless mouse is pivotably connected to the mouse housing 1 of the wireless mouse and the eccentric wheel 104 and the first annular conductor 105 are fixedly connected to the first rotation shaft 103 respectively, the eccentric wheel 104 may swing reciprocatively due to action of inertial force. The reciprocating swing of the eccentric wheel 104 may drive the first rotation shaft 103 to swing reciprocatively. Thus, the first annular conductor 105 fixed on the first rotation shaft 103 will also swing reciprocatively. Meanwhile, because the first annular conductor 105 is located in the magnet field generated by the first magnet 101, when the first annular conductor 105 swings reciprocatively along with the first rotation shaft 103, the first annular conductor 105 may swing reciprocatively in the magnet field generated by the first magnet 101, such that magnetic flux through the annular section of the first annular conductor 105 changes alternately as the first annular conductor 105 swings and an induced electric current is produced in a closed loop formed by the first annular conductor 105 and outputted to power consumption elements in the mouse housing of the wireless mouse so as to keep the power consumption elements to work normally.

As discussed above, the wireless mouse provided by the embodiment of the present disclosure may convert the mechanical energy produced by swing or movement of the wireless mouse into electrical energy by means of the electric generating device and supply the electrical energy to the power consumption elements of the wireless mouse. In comparison with the case that the dry batteries need to be replaced frequently or the lithium ion battery needs to be charged frequently in the wireless mouse, the wireless mouse provided by the embodiment of the present disclosure may generate electricity by its own electric generating device and by the mechanical energy generated in use. It can avoid frequent replacement of the dry batteries and frequent charging of the lithium ion battery, which may save energy and satisfy the requirements of green environmental protection.

The above first rotation shaft 103 may be arranged in the mouse housing of the wireless mouse in multiple ways, for example, the first rotation shaft 103 may be arranged perpendicular to a bottom surface of the mouse housing 1 of the wireless mouse, or the first rotation shaft 103 may be inclined with respect to the bottom surface of the mouse housing 1 of the wireless mouse, as long as it does not interfere the reciprocating swing of the eccentric wheel 104 along with the first rotation shaft 103 when the wireless mouse moves or swings.

In order to enhance the space utilization in the mouse housing 1 of the wireless mouse and the electric generating efficiency of the wireless mouse, with reference to FIG. 1, in a further embodiment, the first rotation shaft 103 is arranged perpendicular to the bottom surface of the mouse housing 1 and the eccentric wheel 104 has a swinging plane parallel to the bottom surface of the mouse housing 1. As well known in the art, in order to reduce discomfort of the user caused by use of the wireless mouse for a long time, the form of the mouse housing 1 is typically designed to conform to the shape of hands of the user. In such a design, a larger free space may be left at a tail of the wireless mouse. When the first rotation shaft 103 is arranged perpendicular to the bottom surface of the mouse housing 1 of the wireless mouse, the swinging plane of the eccentric wheel 104 is arranged parallel to the bottom surface of the mouse housing 1 of the wireless mouse. Thus, when the wireless mouse moves horizontally, the eccentric wheel 104 can more easily swing reciprocatively, so as to enhance the electric generating efficiency of the electric generating device 10. Furthermore, in comparison with inclination of the first rotation shaft 103 with respect to the bottom surface of the mouse housing of the wireless mouse, the arrangement of the first rotation shaft 103 perpendicular to the bottom surface of the mouse housing 1 of the wireless mouse may save the mounting space occupied by the first rotation shaft 103 in the mouse housing 1 of the wireless mouse. In this way, more functional elements may be mounted in the mouse housing 1 of the wireless mouse so as to improve the space utilization in the mouse housing of the wireless mouse.

The first magnet 101 may have a shape selected from a plurality of shapes, for example, U shape, bar shape or the like. When the first magnet 101 is a U-shaped magnet, the first annular conductor 105 is located between an N pole and an S pole of the U-shaped magnet. When the first magnet 101 is a bar-shaped magnet, it needs different poles of two bar-shaped magnets to face towards each other to form a magnet field, that is, the N pole of one bar-shaped magnet faces towards the S pole of the other bar-shaped magnet, such that a magnet field is generated between the N pole and the S pole. When it is implemented, two bar-shaped magnets may be arranged horizontally, such that the N pole end face of the one bar-shaped magnet faces towards the S pole end face of the other bar-shaped magnet to generate a magnet field. Two bar-shaped magnets may alternatively be arranged vertically. At this time, the S pole of one bar-shaped magnet should be embedded in the bottom plate of the mouse housing 1 of the wireless mouse, and only the N pole is remained in the mouse housing of the wireless mouse; the N pole of the other bar-shaped magnet should be embedded in the bottom plate of the mouse housing of the wireless mouse and only the S pole is remained in the mouse housing 1 of the wireless mouse. In this way, the N pole and the S pole of the two bar-shaped magnets in the mouse housing 1 of the wireless mouse face towards each other to form the magnet field.

The first annular conductor 105 may have a shape selected from a plurality of shapes, for example, square ring, circular ring, or the like. In an example, the shape of the first annular conductor 105 is a rectangular ring shape, such that it can occupy a maximum enclosing area in a limited space. When the first annular conductor 105 is fixed on the first rotation shaft 103, the first annular conductor 105 has a long side perpendicular to an axis of the first rotation shaft 103 and the long side of the first annular conductor 105 extends by a same length on both sides of the first rotation shaft 103 along a radial direction of the first rotation shaft 103 from the axis of the first rotation shaft 103, so as to improve the balance and stability of the first annular conductor 105 when it swings reciprocatively along with the first rotation shaft 103. In addition, the first annular conductor 105 is made from metal conductive materials, in particular, copper or aluminum having high electric conductivity.

In the above embodiment, the induced electric current outputted by the electric generating device 10 in operation of generating electricity is generated in the first annular conductor 105 because the first annular conductor 105 and the first magnet 101 swing reciprocatively with respect to each other. Thus, the magnitude and direction of the induced electric current outputted by the electric generating device 10 may vary periodically as the first annular conductor 105 swings reciprocatively. In order that the induced electric current outputted by the electric generating device can be applied to the power consumption elements of the wireless mouse more stably and more safely, with reference to the block diagram in FIG. 4, alternatively, the wireless mouse may further include a rectifier filter 41 electrically connected to the electric generating device 10. In the embodiment, the rectifier filter 41 has a rectifier circuit which is a full-bridge rectifier circuit and a filtering circuit which is a first order RC filter circuit. When the rectifier filter uses the full-bridge rectifier circuit, the induced electric currents in inverse directions outputted by the electric generating device may be converted into a stable DC current output in the same direction, so as to improve the utilization efficiency of the induced electric current outputted by the electric generating device. When the rectifier filter uses the first order RC filter circuit, harmonic components contained in the DC current may be reduced to output the DC current with high quality. And the first order RC filter circuit is composed of standard resistor-capacitor elements, thus the first order RC filter circuit has a simple structure and strong anti-interference.

Figure 4:
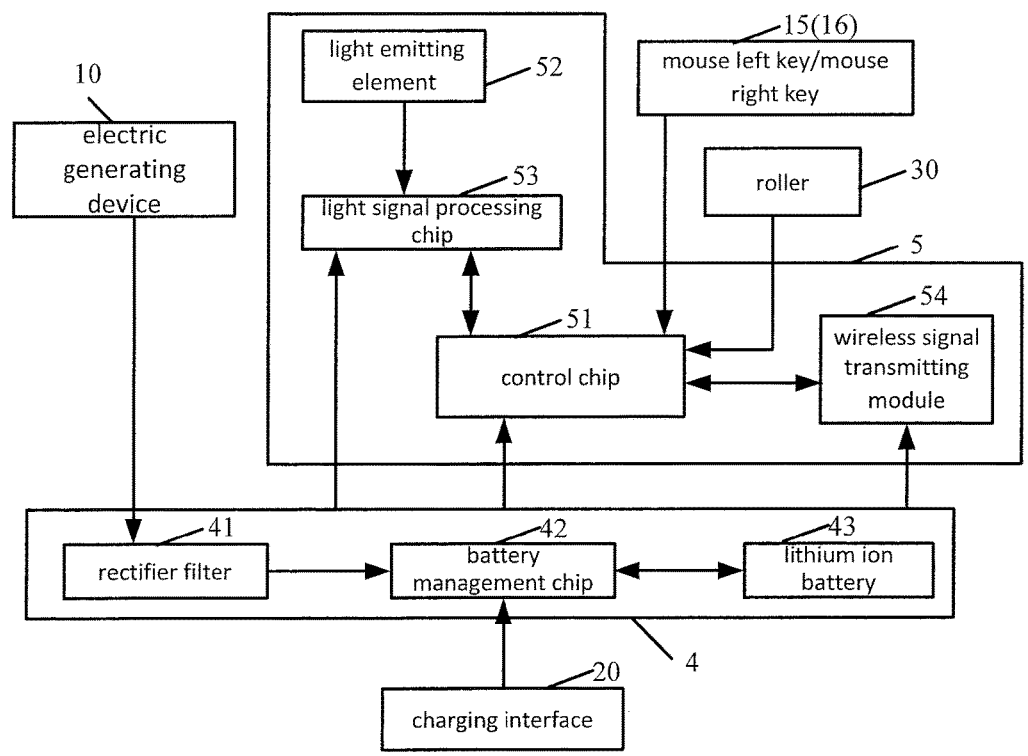
FIG. 4 is a schematic view showing a work principle of a wireless mouse according to an embodiment of the present disclosure.

For the sake of convenience in use of the wireless mouse, in order that the power consumption elements of the wireless mouse can still be kept working normally even if the wireless mouse does not swing or move in use, with reference to FIG. 4, alternatively, the wireless mouse may further include: a battery management chip 42 electrically connected to the rectifier filter 41 and a lithium ion battery 43 electrically connected to the battery management chip 42. The battery management chip 42 is provided in the wireless mouse such that the battery management chip 42 is electrically connected to the rectifier filter 41 and the lithium ion battery 43. The rectifier filter 41 outputs the induced electric current outputted by the electric generating device 10 to the battery management chip 42 after rectifying and filtering the induced electric current. The battery management chip 42 controls current output to the lithium ion battery 43 or the power consumption elements of the wireless mouse for their work, depending on a current work state of the wireless mouse and the state of electric energy of the lithium ion battery 43. When the wireless mouse swings or moves, the electric energy outputted by the electric generating device 10 may not only satisfy the requirement of work of the power consumption elements of the wireless mouse, but also be supplied to the lithium ion battery 43 for storage. When the wireless mouse has not swung or moved for a long time, the lithium ion battery 43 may supply the electric energy to the power consumption elements of the wireless mouse for work. It should be noted that the rectifier filter 41, the battery management chip 42 and the lithium ion battery 43 may be integrated in a power supply management module 4, to reduce the occupied space in the wireless mouse.

In order that the wireless mouse may be used when it has not swung or moved for a long time, with reference to FIG. 1, based on the above embodiment, the wireless mouse may further include a charging interface 20 electrically connected to the battery management chip 42 and a dustproof cap covering the charging interface 20. In particular, the charging interface 20 may be a conventional 5V voltage power supply interface, so that the user can charge the battery by a universal charger and a charging cable. In addition, the charging interface 20 may be arranged at a bottom end of the tail of the wireless mouse, to use the space in the mouse housing 1 of the wireless mouse efficiently. In the idle period in which the wireless mouse does not work, the lithium ion battery 43 can be charged by connecting the charging interface 20 to an external power supply. After the lithium ion battery 43 is fully charged, the battery management chip 42 preferably controls the lithium ion battery 43 to supply the electric energy contained in the lithium ion battery 43 to the power consumption elements of the wireless mouse for their work. Meanwhile, under control of the battery management chip 42, the electric energy outputted by the electric generating device 10 is supplied to the lithium ion battery 43 for charging. The charging interface 20 is also provided with the dustproof cap for shielding dust, which may prolong the lifetime of the charging interface. The dustproof cap may be a rubber dustproof cap. In comparison with the rechargeable wireless mouse in the prior art, the wireless mouse provided by the embodiment may force the electric generating device 10 to generate electricity emergently by swinging the wireless mouse at multiple times or moving the wireless mouse rapidly when the lithium ion battery 43 has been discharged completely and cannot be charged timely. In this way, the wireless mouse may be restored to the work state temporarily, so as to satisfy the requirements in use.

With reference to FIGS. 1 and 4, the wireless mouse may further include a main control circuit board 5 electrically connected to the battery management chip 42. A control chip 51, a light emitting element 52, a light signal processing chip 53 and a wireless signal transmitting module 54 are provided on the main control circuit board 5, the light signal processing chip and the wireless signal transmitting module being connected to the control chip 51. The control chip 51, the light emitting element 52, the light signal processing chip 53 and the wireless signal transmitting module 54 mounted on the main control circuit board 5 are power consumption elements of the wireless mouse. After the main control circuit board 5 receives the electric current outputted by the battery management chip 42, the circuit on the main control circuit board 5 is used to supply the electric current to the control chip 51, the light emitting element 52, the light signal processing chip 53 and the wireless signal transmitting module 54 for their work.

The light emitting element 52 may be a light emitting diode. After the bottom surface of the mouse housing 1 of the wireless mouse receives a light signal emitted from the light emitting diode, it reflects the light signal to the light signal processing chip 53. After the light signal processing chip 53 receives the light signal reflected by the bottom surface of the mouse housing 1 of the wireless mouse and analyzes and processes the light signal, the light signal processing chip 53 converts the reflected light signal into a pulsed signal to be outputted to the control chip 51. After the control chip 51 receives the pulsed signal transmitted by the light signal processing chip 53, the control chip 51 analyzes the pulsed signal to determine the direction and distance of movement of the wireless mouse, so as to complete positioning the movement of the wireless mouse. In comparison with the conventional wireless mouse which performs positioning mechanically, the embodiments of the present disclosure uses the above structure, improves the positioning accuracy of the wireless mouse by means of positioning of an optical image and enhances the reliability of the wireless mouse. The interaction of data between the control chip and the external is achieved by data transmission of the wireless signal transmitting module. The wireless signal transmitting module may in particular be a RF transmitting module or a Bluetooth wireless transmitting module. The RF transmitting module has small volume, low cost and stability and reliability in short distance data transmission; the Bluetooth wireless transmitting module has low cost, low power consumption and convenience and high speed in short distance data transmission.

Figure 2:
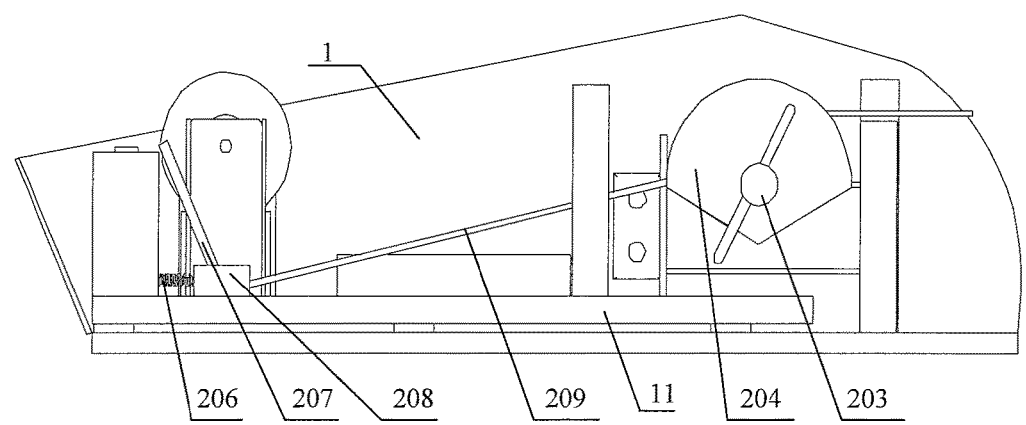
FIG. 2 is a schematic side view showing an internal structure of a wireless mouse according to an embodiment of the present disclosure.

In order to further increase the output electric energy of the electric generating device, with reference to FIG. 1 and FIG. 2, alternatively, the electric generating device 10 further includes: a second magnet 201 fixed in the mouse housing 1, a second rotation shaft 203 mounted pivotably in the mouse housing 1, and a first linkage slider mechanism 200 connected to a mouse left key 15 of the mouse housing 1 and the second rotation shaft 203 respectively for transmission of motion. A second annular conductor 205 is fixed on the second rotation shaft 203 and located in a magnet field generated by the second magnet 201, and when the second rotation shaft 203 drives the second annular conductor 205 to rotate, magnetic flux through an annular section of the second annular conductor 205 changes. With reference to FIG. 2, when the mouse left key 15 is pressed down, the first linkage slider mechanism 200 is subject to the pressure of the mouse left key 15 and converts the pressure in vertical downwards direction into a pushing force in horizontal rightwards direction. The second rotation shaft 203 is forced by the pushing force to move clockwise. When the mouse left key 15 is released, the first linkage slider mechanism 200 is subject to the return force of the mouse left key 15 and converts the return force in vertical upwards direction into a dragging force in horizontal leftwards direction. The second rotation shaft 203 is forced by the dragging force to move anti-clockwise. When the mouse left key is clicked repeatedly at multiple times, the second rotation shaft 203 accordingly swings reciprocatively. As the second magnet 201 is fixedly mounted in the mouse housing 1 of the wireless mouse and the second annular conductor 205 is located in the magnet field generated by the second magnet 201, when the second annular conductor 205 swings reciprocatively along with the second rotation shaft 203, the second annular conductor 205 swings reciprocatively in the magnet field generated by the second magnet 201. In this way, magnetic flux through an annular section of the second annular conductor 205 can changes alternately and an induced electric current in a closed loop formed by the second annular conductor 205 is outputted.

Figure 3:
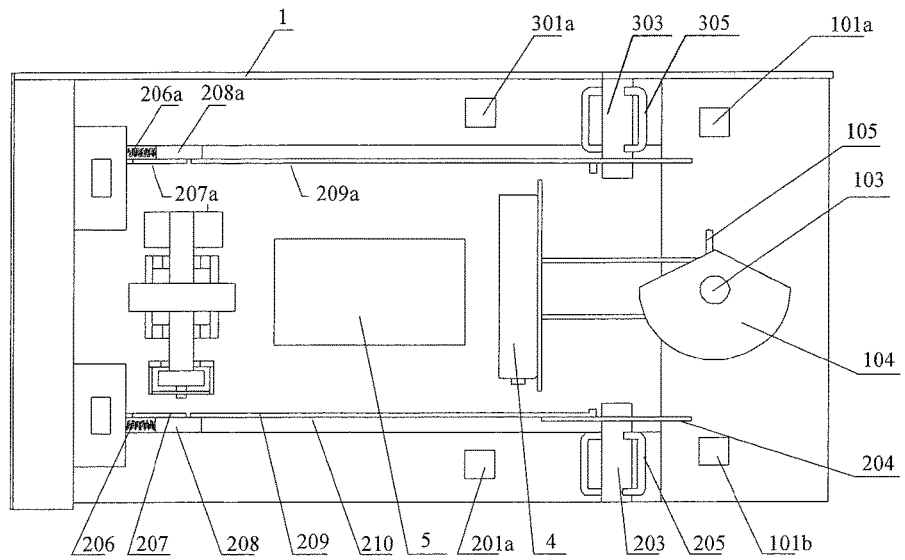
FIG. 3 is a schematic top view showing an internal structure of a wireless mouse according to an embodiment of the present disclosure.

In order to further increase the output electric energy of the electric generating device, with reference to FIG. 1 and FIG. 3, alternatively, the electric generating device 10 further includes: a third magnet 301 fixed in the mouse housing, a third rotation shaft 303 mounted pivotably in the mouse housing 1, and a second linkage slider mechanism 300 connected to a mouse right key 16 of the mouse housing 1 and the third rotation shaft 303 respectively for transmission of motion. A third annular conductor 305 is fixed on the third rotation shaft 303 and located in a magnet field generated by the third magnet 301, and when the third rotation shaft 303 drives the third annular conductor 305 to rotate, magnetic flux through an annular section of the third annular conductor 305 changes. The mouse right key 16 of the wireless mouse may also be clicked repeatedly. The principle of generating electricity is same to that of the mouse left key. The details may be referred to the above description associated with the mouse left key and will be omitted herein.

Regarding the arrangements of the second rotation shaft 203, the third rotation shaft 303 mounted pivotably on the mouse housing 1 respectively, it may refer to that of the first rotation shaft 103 mounted pivotably on the mouse housing 1. The arrangements of the second rotation shaft 203, the third rotation shaft 303 and the first rotation shaft 103 mounted pivotably on the mouse housing 1 are substantially same except for different positions at which they are mounted in the mouse housing 1. The details will be omitted herein. The second annular conductor 205 may be fixed on the second rotation shaft 203 for example by means of key connection, welding connection, rivet connection, or threaded connection or the like. The third annular conductor 305 may be fixed on the third rotation shaft 303 for example by means of key connection, welding connection, rivet connection, or threaded connection or the like.

The second magnet 201 and the third magnet 301 each may be the U-shaped magnet or the bar-shaped magnet, or the like with reference to the first magnet 101. With reference to FIG. 3, when all of the first magnet 101, the second magnet 201 and the third magnet 301 are the bar-shaped magnet, in order to enhance the space utilization in the mouse housing of the wireless mouse, on a basis of layout of the first magnet 101, the second magnet 201 and the third magnet 301 in the mouse housing of the wireless mouse, the magnet field generated by the first magnet 101, the magnet field generated by the second magnet 201 and the magnet field generated by the third magnet 301 are generated by four bar-shaped magnets. One of the four bar-shaped magnets is used to generate both the magnet field generated by the first magnet 101 and the magnet field generated by the second magnet 201, and another of the four bar-shaped magnets is used to generate both the magnet field generated by the first magnet 101 and the magnet field generated by the third magnet 301.

In a specific embodiment, the four bar-shaped magnets are arranged in a rectangle and fixed vertically in the mouse housing 1 of the wireless mouse. The four bar-shaped magnets are arranged at four corners of the same rectangle. Each of the four bar-shaped magnets has one pole embedded in a bottom plate of the mouse housing 1 of the wireless mouse and the other pole arranged within the mouse housing 1 of the wireless mouse. And the poles arranged within the mouse housing 1 of the wireless mouse for two adjacent bar-shaped magnets are different from each other. With reference to FIG. 3, depending on the projections of the four bar-shaped magnets in FIG. 3, they are numbered in sequence along clockwise direction from the upper right corner, as a first bar-shaped magnet 101a, a second bar-shaped magnet 101b, a third bar-shaped magnet 201a and a fourth bar-shaped magnet 301a. The pole of the first bar-shaped magnet arranged within the mouse housing of the wireless mouse may be N pole or S pole. In an example, the pole of the first bar-shaped magnet 101a arranged within the mouse housing 1 of the wireless mouse is the N pole, then the pole of the second bar-shaped magnet 101b arranged within the mouse housing 1 of the wireless mouse is the S pole, the pole of the third bar-shaped magnet 201a arranged within the mouse housing 1 of the wireless mouse is the N pole, and the pole of the fourth bar-shaped magnet 301a arranged within the mouse housing 1 of the wireless mouse is the S pole. The magnet field generated by the N pole of the first bar-shaped magnet 101a and the S pole of the second bar-shaped magnet 101b facing towards each other is the magnet field generated by the first magnet 101. The magnet field generated by the N pole of the third bar-shaped magnet 201a and the S pole of the second bar-shaped magnet 101b facing towards each other is the magnet field generated by the second magnet 201. The magnet field generated by the second magnet 201 and the magnet field generated by the first magnet 101 are both derived from the second bar-shaped magnet 101b. The magnet field generated by the S pole of the fourth bar-shaped magnet 301a and the N pole of the first bar-shaped magnet 101a facing towards each other is the magnet field generated by the third magnet 301. The magnet field generated by the third magnet 301 and the magnet field generated by the first magnet 101 are both derived from the first bar-shaped magnet 101a.

In order to enhance space utilization within the mouse housing of the wireless mouse, alternatively, the second rotation shaft 203 is mounted pivotably on a side wall of the mouse housing of the wireless mouse and the second rotation shaft 203 is arranged parallel to a bottom surface of the mouse housing of the wireless mouse. The second annular conductor 205 may be a rectangular metal ring conductor. When the second annular conductor 205 is fixed on the second rotation shaft 203, the second annular conductor 205 has a long side perpendicular to an axis of the second rotation shaft 203 and the long side of the second annular conductor 205 extends by a same length on both sides of the second rotation shaft 203 along a radial direction of the second rotation shaft 203 from the axis of the second rotation shaft 203, so as to improve the balance and stability of the second annular conductor 205 when it swings reciprocatively along with the second rotation shaft 203. In the embodiment, the third rotation shaft 303 and the third annular conductor 305 use the same structure as the second rotation shaft 203 and the second annular conductor 205. The details will be omitted herein.

As shown in FIGS. 1 to 3, alternatively, the first linkage slider mechanism 200 includes: a first guide rail 210 arranged on the bottom surface of the mouse housing 1 and provided with a first guide groove 12 perpendicular to the second rotation shaft 203; a first slider 208 mounted slidably in the first guide groove 12; and two first connecting rods, wherein each of the two first connecting rods has one end hinged with the first slider 208 and one of the two first connecting rods has another end connected to the mouse left key 15 of the mouse housing and the other one of the two first connecting rods has another end connected to the second rotation shaft 203.

With reference to FIG. 1 and FIG. 2, in particular, the first guide rail 11 and the mouse housing 1 of the wireless mouse are arranged integrally, or the first guide rail 11 may be mounted fixedly on the bottom surface of the mouse housing 1 of the wireless mouse by for example bolt connection. A first guide groove 12 is arranged in an upper surface of the first guide rail 11 and recessed into the upper surface (FIG. 1). The first guide groove 12 extends throughout the whole first guide rail 11 along a lengthwise direction of the first guide rail 11 and perpendicular to the projection of the second rotation shaft 203 onto the bottom surface of the mouse housing 1 of the wireless mouse. The first slider 208 is mounted in the first guide groove 12 and may slide horizontally along the first guide groove 12. The two first connecting rods are called as a first link rod 207 and a second link rod 209 respectively. One end of the first link rod 207 is hinged with the first slider 208; the other end of the first link rod 207 is connected to the mouse left key. One end of the second link rod 209 is hinged with the first slider 208; the other end of the second link rod 209 is connected to the second rotation shaft 203.

The second linkage slider mechanism 300 connected to the mouse right key 16 has the same structure as the first linkage slider mechanism 200 connected to the mouse left key 15. It includes a second slider 208a, a second guide groove 13 and a first link rod 207a and a second link rod 209a, as shown in FIG. 1 and FIG. 3. The details will be omitted herein.

In use, the mouse left key 15 is pressed down and one end of the first link rod 207 connected to the mouse left key 15 moves downwards and the other end of the first link rod 207 pushes the first slider 208 to slide in horizontal rightwards direction along the first guide groove 12 of the first guide rail; and one end of the second link rod 209 hinged with the first slider 208 moves in horizontal rightwards direction as the first slider 208 slides horizontally and the other end of the second link rod 209 drives the second rotation shaft 203 to move clockwise. When the mouse left key 15 is released, one end of the first link rod 207 connected to the mouse left key 15 moves upwards and the other end of the first link rod 207 drives the first slider 208 to slide in horizontal leftwards direction along the first guide groove 12 of the first guide rail; one end of the second link rod 209 hinged with the first slider 208 moves in horizontal leftwards direction as the first slider 208 slides horizontally and the other end of the second link rod 209 drives the second rotation shaft 203 to move anticlockwise. When the mouse left key 15 is clicked repeatedly at multiple times, the second rotation shaft 203 swings reciprocatively correspondingly.

In the above embodiment, alternatively, one end of the first link rod 207 is fixedly connected to the mouse left key 15 by a connection manner such as welding or riveting, and the other end of the first link rod 207 is hinged with a center of an upper end face of the first slider 208; and one end of the second link rod 209 is hinged with a center of a back side face of the first slider 208, and the other end of the second link rod 209 is fixedly connected to the second rotation shaft 203 by for example welding connection or rivet connection. In addition, in order to enhance swinging magnitude of the second rotation shaft 203, alternatively, a sector plate 204 is fixedly mounted on the second rotation shaft 203 and has a lateral edge connected fixedly to one end of the second link rod 209; when the second link rod 209 moves reciprocatively, the second link rod 209 may drive the second rotation shaft 203 to swing reciprocatively by means of the sector plate 204. It should be noted that the mouse housing 1 of the wireless mouse is typically composed of an upper body and a lower body. In order to allow the mouse housing 1 of the wireless mouse to be detached conveniently, the first link rod 207 may be connected to the mouse left key 15 by detachable connection, for example, snap-fit connection.

When the mouse left key 15 is released, in order to speed up sliding restoration of the first slider 208, alternatively, the first linkage slider mechanism 200 further includes a spring 206 fixedly connected to the mouse housing 1 and the first slider 208 to drive the first slider 208 to return. In an embodiment, the spring 206 is fixedly connected to the mouse housing 1 and the first slider 208 by means of fixing manner such as welding connection or threaded connection. One end of the spring 206 is fixed to a center of a front side face of the first slider 208 and the other end of the spring 206 may be fixedly connected directly to the mouse housing 1, or may also be fixedly connected to the mouse housing 1 by a fixing bracket. When the mouse left key is pressed down, the spring 206 is prolonged as the first slider 208 slides. When the mouse left key is released, the return force of the spring 206 may speed up the sliding restoration of the first slider 208. The second linkage slider mechanism 300 connected to the mouse right key may also include a spring 206a fixedly connected to the mouse housing 1 and the second slider 208a to drive the second slider 208a to return. The spring has the same structure as the spring 206 in the first linkage slider mechanism 200. The details will be omitted herein.

On a basis of the wireless mouse provided by the above embodiment, as shown in FIG. 5, in order to increase the electric energy outputted by the electric generating device 10, the mechanical energy produced by rolling of a roller 30 may also be used to generate electricity. With reference to the structure of the electric generating device in a case where the wireless mouse is moved or clicked, electricity can be generated using the same method of generating electricity, for example, a fourth annular conductor is provided on a roller shaft of the wireless mouse and the fourth annular conductor is located in a magnet field generated by a fourth magnet. Thus, when the fourth annular conductor rotates as the roller rolls, the fourth annular conductor rotates with respect to the fourth magnet, such that magnetic flux through a plane enclosed by the fourth annular conductor changes alternately and an induced electric current output is produced in a closed loop formed by the fourth annular conductor.

In the description of the present disclosure, specific features, structures, materials or characteristics may be combined in a suitable manner in any one or more embodiments or examples.

In the electric generating device of the wireless mouse provided by the above respective embodiments, the first rotation shaft is connected pivotably to the mouse housing of the wireless mouse and the eccentric wheel and the first annular conductor are fixedly connected to the first rotation shaft respectively, thus, when the wireless mouse swings or moves, the eccentric wheel may swing reciprocatively due to effects of an inertial force and the first rotation shaft swings reciprocatively along with the eccentric wheel. The first annular conductor fixed on the first rotation shaft may also swing reciprocatively as the first rotation shaft swings reciprocatively. However, the first magnet is fixed within the mouse housing of the wireless mouse and the first annular conductor is located in the magnet field generated by the first magnet, thus, when the first annular conductor swings reciprocatively along with the first rotation shaft, the first annular conductor swings reciprocatively in the magnet field generated by the first magnet. At this time, the magnetic flux through the annular section of the first annular conductor changes alternately as the first annular conductor swings reciprocatively and an induced electric current output is produced in a closed loop formed by the first annular conductor.

Therefore, the wireless mouse provided by the present disclosure may convert the mechanical energy produced by swinging or movement of the wireless mouse into electric energy by means of the electric generating device and supply the electric energy to the power consumption elements of the wireless mouse for their work. In comparison with the case that the dry batteries need to be replaced frequently or the lithium ion battery needs to be charged frequently in the wireless mouse in the prior art, the wireless mouse provided by the embodiment of the present disclosure may generate electricity by its own electric generating device and by the mechanical energy generated in use. It can avoid frequent replacement of the dry batteries and frequent charging of the lithium ion battery, which may save energy and satisfy the requirements of green environmental protection.

Only some exemplified embodiments of the present disclosure are explained in the above description. However, the scope of the present disclosure is not limited to those. Any variants or alternations that the skilled person in the art can easily envisage within the technical range of the present disclosure should fall within the scope of the present disclosure. Therefore, the scope of the present disclosure should be defined by the scope of the appended claims.

What is claimed is:

1. A wireless mouse, comprising:
   a mouse housing, and
   an electric generating device mounted in the mouse housing, wherein the electric generating device comprises:
   a first rotation shaft mounted pivotably in the mouse housing,
   an eccentric wheel fixed on the first rotation shaft,
   a first annular conductor fixed on the first rotation shaft, and
   a first magnet fixed in the mouse housing,
   wherein the first annular conductor is arranged in a magnet field generated by the first magnet, and is configured such that magnetic flux through an annular section of the first annular conductor changes when the first rotation shaft drives the first annular conductor to rotate, and
   wherein the electric generating device further comprises: a second rotation shaft mounted pivotably in the mouse housing, and a first linkage slider mechanism connected to a mouse left key of the mouse housing and the second rotation shaft respectively for transmission of motion.

2. The wireless mouse according to claim 1, wherein the electric generating device further comprises: a second magnet fixed in the mouse housing, and
   wherein a second annular conductor is fixed on the second rotation shaft and located in a magnet field generated by the second magnet, and is configured such that magnetic flux through an annular section of the second annular conductor changes when the second rotation shaft drives the second annular conductor to rotate.

3. The wireless mouse according to claim 2, wherein the first linkage slider mechanism comprises:
   a first guide rail arranged on a bottom surface of the mouse housing and provided with a first guide groove perpendicular to the second rotation shaft;
   a first slider mounted slidably in the first guide groove; and
   two first connecting rods,
   wherein each of the two first connecting rods has one end hinged with the first slider, and one of the two first connecting rods has another end connected to the mouse left key of the mouse housing and the other one of the two first connecting rods has another end connected to the second rotation shaft.

4. The wireless mouse according to claim 2, wherein the electric generating device further comprises: a third magnet fixed in the mouse housing, a third rotation shaft mounted pivotably in the mouse housing, and a second linkage slider mechanism connected to a mouse right key of the mouse housing and the third rotation shaft respectively for transmission of motion, and
   wherein a third annular conductor is fixed on the third rotation shaft and located in a magnet field generated by the third magnet, and is configured such that magnetic flux through an annular section of the third annular conductor changes when the third rotation shaft drives the third annular conductor to rotate.

5. The wireless mouse according to claim 4, wherein the second linkage slider mechanism comprises:
   a second guide rail arranged on a bottom surface of the mouse housing and provided with a second guide groove perpendicular to the third rotation shaft;
   a second slider mounted slidably in the second guide groove; and
   two second connecting rods,
   wherein each of the two second connecting rods has one end hinged with the second slider, and one of the two second connecting rods has another end connected to the mouse right key of the mouse housing and the other one of the two second connecting rods has another end connected to the third rotation shaft.

6. The wireless mouse according to claim 5, wherein the first linkage slider mechanism further comprises a spring fixedly connected to the mouse housing and the first slider to drive the first slider to return; and/or
wherein the second linkage slider mechanism further comprises a spring fixedly connected to the mouse housing and the second slider to drive the second slider to return.

7. The wireless mouse according to claim 4, wherein all of the first magnet, the second magnet and the third magnet are U-shaped magnets.

8. The wireless mouse according to claim 4, wherein the first magnet is a bar-shaped magnet and the wireless mouse comprises two first magnets, and one of the two first magnets has N pole facing towards S pole of the other one of the two first magnets; and/or
the second magnet is a bar-shaped magnet and the wireless mouse comprises two second magnets, and one of the two second magnets has N pole facing towards S pole of the other one of the two second magnets; and/or
the third magnet is a bar-shaped magnet and the wireless mouse comprises two third magnets, and one of the two third magnets has N pole facing towards S pole of the other one of the two third magnets.

9. The wireless mouse according to claim 4, wherein all of the first magnet, the second magnet and the third magnet are bar-shaped magnets;
the magnet field generated by the first magnet, the magnet field generated by the second magnet and the magnet field generated by the third magnet are generated by four bar-shaped magnets; wherein one of the four bar-shaped magnets is used to generate said magnet field generated by the first magnet and said magnet field generated by the second magnet, and one of the four bar-shaped magnets is used to generate said magnet field generated by the first magnet and said magnet field generated by the third magnet.

10. The wireless mouse according to claim 4, wherein all of the first annular conductor, the second annular conductor and the third annular conductor are rectangular metal ring conductors.

11. The wireless mouse according to claim 1, further comprising a rectifier filter electrically connected to the electric generating device.

12. The wireless mouse according to claim 11, further comprising: a battery management chip electrically connected to the rectifier filter and a lithium ion battery electrically connected to the battery management chip.

13. The wireless mouse according to claim 12, further comprising: a charging interface electrically connected to the battery management chip and a dustproof cap covering the charging interface.

14. The wireless mouse according to claim 12, further comprising: a main control circuit board electrically connected to the battery management chip;
wherein the main control circuit board is provided with a control chip, a light emitting element, a light signal processing chip and a wireless signal transmitting module, the light signal processing chip and the wireless signal transmitting module being connected to the control chip in a manner of signal connection respectively;
wherein the wireless signal transmitting module is a RF transmitting module or a Bluetooth wireless transmitting module.

15. A wireless mouse, comprising:
a mouse housing, and
an electric generating device mounted in the mouse housing, wherein the electric generating device comprises:
a first rotation shaft mounted pivotably in the mouse housing,
an eccentric wheel fixed on the first rotation shaft,
a first annular conductor fixed on the first rotation shaft, and
a first magnet fixed in the mouse housing,
wherein the first annular conductor is arranged in a magnet field generated by the first magnet, and is configured such that magnetic flux through an annular section of the first annular conductor changes when the first rotation shaft drives the first annular conductor to rotate, and
wherein the first rotation shaft is arranged perpendicular to a bottom surface of the mouse housing and the eccentric wheel has a swinging plane parallel to the bottom surface of the mouse housing.

16. The wireless mouse according to claim 15, wherein the electric generating device further comprises: a second magnet fixed in the mouse housing, a second rotation shaft mounted pivotably in the mouse housing, and a first linkage slider mechanism connected to a mouse left key of the mouse housing and the second rotation shaft respectively for transmission of motion, and
wherein a second annular conductor is fixed on the second rotation shaft and located in a magnet field generated by the second magnet, and is configured such that magnetic flux through an annular section of the second annular conductor changes when the second rotation shaft drives the second annular conductor to rotate.

17. The wireless mouse according to claim 16, wherein the first linkage slider mechanism comprises:
a first guide rail arranged on a bottom surface of the mouse housing and provided with a first guide groove perpendicular to the second rotation shaft;
a first slider mounted slidably in the first guide groove; and
two first connecting rods,
wherein each of the two first connecting rods has one end hinged with the first slider, and one of the two first connecting rods has another end connected to the mouse left key of the mouse housing and the other one of the two first connecting rods has another end connected to the second rotation shaft.

18. The wireless mouse according to claim 16, wherein the electric generating device further comprises: a third magnet fixed in the mouse housing, a third rotation shaft mounted pivotably in the mouse housing, and a second linkage slider mechanism connected to a mouse right key of the mouse housing and the third rotation shaft respectively for transmission of motion, and
wherein a third annular conductor is fixed on the third rotation shaft and located in a magnet field generated by the third magnet, and is configured such that magnetic flux through an annular section of the third annular conductor changes when the third rotation shaft drives the third annular conductor to rotate.

19. The wireless mouse according to claim 18, wherein the second linkage slider mechanism comprises:
a second guide rail arranged on a bottom surface of the mouse housing and provided with a second guide groove perpendicular to the third rotation shaft;
a second slider mounted slidably in the second guide groove; and
two second connecting rods, wherein each of the two second connecting rods has one end hinged with the second slider, and one of the two second connecting rods has another end connected to the mouse right key of the mouse housing and the other one of the two second connecting rods has another end connected to the third rotation shaft.

20. The wireless mouse according to claim 19, wherein the first linkage slider mechanism further comprises a spring fixedly connected to the mouse housing and the first slider to drive the first slider to return; and/or wherein the second linkage slider mechanism further comprises a spring fixedly connected to the mouse housing and the second slider to drive the second slider to return.

* * * * *